US012771740B2

(12) United States Patent
Liu

(10) Patent No.: US 12,771,740 B2
(45) Date of Patent: Oct. 20, 2026

(54) MAP DATA COLLECTION METHOD AND APPARATUS, AND SYSTEM

(71) Applicant: Yinwang Intelligent Technologies Co., Ltd., Shenzhen (CN)

(72) Inventor: Jianqin Liu, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 173 days.

(21) Appl. No.: 17/947,903

(22) Filed: Sep. 19, 2022

(65) Prior Publication Data

US 2023/0020935 A1 Jan. 19, 2023

Related U.S. Application Data

(63) Continuation of application No. PCT/CN2021/081335, filed on Mar. 17, 2021.

(30) Foreign Application Priority Data

Mar. 20, 2020 (CN) ........................ 202010203284.X

(51) Int. Cl.
*H04L 67/10* (2022.01)
*G01C 21/00* (2006.01)

(52) U.S. Cl.
CPC .......... *H04L 67/10* (2013.01); *G01C 21/3841* (2020.08); *G01C 21/3893* (2020.08)

(58) Field of Classification Search
CPC ............ G01C 21/3893; G01C 21/3841; G01C 21/3815; G08G 1/0141; G08G 1/0112; G08G 1/0969; H04L 67/5651; H04L 67/10; H04L 1/0023; H04L 1/0015; H04L 1/0036; H04W 4/44; H04W 4/46
See application file for complete search history.

(56) References Cited

U.S. PATENT DOCUMENTS

| | | | | |
|---|---|---|---|---|
| 9,009,345 | B1 * | 4/2015 | Carbone | G06F 16/9537 370/401 |
| 2007/0088497 | A1 | 4/2007 | Jung | |
| 2018/0012370 | A1 | 1/2018 | Aghamohammadi et al. | |
| 2018/0245929 | A1 * | 8/2018 | Watanabe | G01C 21/3848 |

(Continued)

FOREIGN PATENT DOCUMENTS

| | | |
|---|---|---|
| CN | 101319912 A | 12/2008 |
| CN | 105100215 A | 11/2015 |

(Continued)

*Primary Examiner* — Abdhesh K Jha
*Assistant Examiner* — Alexander George Matta
(74) *Attorney, Agent, or Firm* — Leydig, Voit & Mayer, Ltd.

(57) ABSTRACT

Embodiments of this application provide a map data collection method and apparatus, and a system, to report map data in a targeted manner. The method includes: receiving a first instruction from a network side device, where the first instruction instructs a map data reporting manner to a first vehicle, the first instruction includes confidence information, and the confidence information indicates confidence that map data reported by the first vehicle; and sending the map data to the network side device in the map data reporting manner instructed by the first instruction, where confidence of the map data is not lower than the confidence indicated by the confidence information.

14 Claims, 7 Drawing Sheets

(56) References Cited

U.S. PATENT DOCUMENTS

| | | | | |
|---|---|---|---|---|
| 2018/0293809 | A1* | 10/2018 | James | H04W 4/38 |
| 2018/0313655 | A1* | 11/2018 | Stephens | G01C 21/3453 |
| 2019/0051153 | A1 | 2/2019 | Giurgiu et al. | |
| 2019/0230536 | A1* | 7/2019 | Da Silva | H04L 1/0026 |
| 2019/0265050 | A1 | 8/2019 | Fujimoto | |
| 2019/0325737 | A1* | 10/2019 | Moustafa | G01C 21/3881 |
| 2019/0392635 | A1* | 12/2019 | Ma | G01C 21/3841 |
| 2020/0034661 | A1* | 1/2020 | Kim | G06V 10/764 |
| 2022/0028254 | A1* | 1/2022 | Ogawa | G08G 1/096716 |
| 2022/0173863 | A1* | 6/2022 | Han | H04W 4/46 |

FOREIGN PATENT DOCUMENTS

| | | | |
|---|---|---|---|
| CN | 204993644 | U | 1/2016 |
| CN | 108036794 | A | 5/2018 |
| CN | 108282739 | A | 7/2018 |
| CN | 109387208 | A | 2/2019 |
| CN | 109510851 | A | 3/2019 |
| CN | 109862084 | A | 6/2019 |
| CN | 110799804 | A | 2/2020 |
| EP | 3674920 | A1 | 7/2020 |
| JP | 2018025865 | A | 2/2018 |
| JP | 2019168271 | A | 10/2019 |
| JP | 2020038405 | A | 3/2020 |
| WO | 2019052533 | A1 | 3/2019 |

* cited by examiner

MAP DATA COLLECTION METHOD AND APPARATUS, AND SYSTEM

CROSS-REFERENCE TO RELATED APPLICATION

This application is a continuation of International Application No. PCT/CN2021/081335, filed on Mar. 17, 2021, which claims priority to Chinese Patent Application No. 202010203284.X, filed on Mar. 20, 2020. The disclosures of the aforementioned applications are hereby incorporated by reference in their entireties.

TECHNICAL FIELD

This application relates to the field of intelligent connected vehicle technologies, and in particular, to a map data collection method and apparatus, and a system.

BACKGROUND

Currently, a map has become a tool for vehicle navigation. The map can accurately display a road condition around a vehicle, plan a driving route for a user, and help the user accurately arrive at a destination.

In actual driving, the road condition changes frequently, for example, a road is closed or a traffic sign changes. Therefore, to ensure accuracy of the map, the map needs to be updated in real time. Updating the map is to update map elements included in the map, for example, a lane line, a speed limit sign, a street lamp or a road sign, a traffic light, or a stop line. In the conventional technology, map data is collected based on a "crowdsourcing collection mode", to implement map update. The so-called "crowdsourcing collection mode" refers to a collection mode in which non-professional surveying and mapping vehicles (also referred to as crowdsourced vehicles) such as private cars, taxis, or buses collect data of various map elements in an ambient environment by using existing collection devices on the vehicles. In the crowdsourcing collection mode, a quantity of map data that can be collected in each area depends on a quantity of crowdsourced vehicles in the area. For some areas with relatively small vehicle traffic (such as non-mainstream roads), map data collection usually takes a relatively long time. As a result, collection efficiency in the crowdsourcing collection mode is relatively low. In some areas with heavy traffic (such as mainstream roads), map data is redundant. In addition, various crowdsourced vehicles are equipped with various types of collection devices that have great performance differences. Consequently, map data formats are inconsistent, which increases complexity of subsequent data processing.

Therefore, how to collect map data more efficiently is a problem that urgently needs to be resolved currently.

SUMMARY

According to a map data collection method and apparatus, and a system provided in the embodiments of this application, map data can be reported in a targeted manner, data redundancy can be avoided, and map data collection efficiency can be improved.

The following technical solutions are used in embodiments of this application.

According to a first aspect, a map data collection method is provided. The method is applied to a first vehicle, and the method includes: receiving a first instruction from a network side device, where the first instruction is used to instruct a map data reporting manner to the first vehicle, and the first instruction includes limitation information of map data reported by the first vehicle to the network side device; optionally, the limitation information may include confidence information, and the confidence information is used to indicate confidence that the map data reported by the first vehicle reaches; and optionally, the limitation information may include a collection area, a collection time frequency, a collection space density, a collection object, priority information, and a type, a specification, or a quantity of sensors used for collection of the map data, that is, the first vehicle may perform collection by using a collection indicator specified by the network side device, or may perform collection on the collection object or at the collection area specified by the network side device, or perform collection by using a collection device specified by the network side device; and sending the map data to the network side device based on the map data reporting manner instructed by the first instruction, where the map data meets a limitation of the limitation information on the reported map data, for example, when the limitation information is confidence information, confidence of the map data is not lower than the confidence indicated by the confidence information. In this embodiment of this application, the first vehicle may receive the first instruction from the network side device, and the first instruction may instruct the map data reporting manner to the first vehicle. Therefore, after receiving the first instruction, the first vehicle may report map data in a targeted manner based on the map data reporting manner instructed by the first instruction. Therefore, the map data reported by the vehicle to the network side device can be reduced, data redundancy can be avoided, and collection efficiency can be improved, thereby reducing complexity of subsequent data processing to some extent. For example, if the limitation information includes the confidence information, before reporting the map data to the server, the first vehicle may first remove, based on the confidence information in the first instruction, map data that does not meet a confidence requirement from the map data, and then report the map data. This improves precision of the reported map data, and further improves efficiency of information transmission between the vehicle and the server.

In a possible design, the method further includes: receiving a second instruction from the network side device, where the second instruction is used to instruct the first vehicle to stop reporting map data in the manner instructed by the first instruction; and stopping, according to the second instruction, reporting the map data in the manner instructed by the first instruction. Based on this solution, when determining that the first vehicle no longer needs to report the data in the manner instructed by the first instruction, the network side device may send the second instruction to the first vehicle. After receiving the second instruction, the first vehicle stops, according to the instruction of the second instruction, reporting the map data in the manner instructed by the first instruction, thereby avoiding data redundancy.

In a possible design, the method further includes: obtaining first trigger information, where the first trigger information is used to indicate a first trigger condition that the first vehicle meets when the first vehicle stops reporting the map data in the manner instructed by the first instruction; determining that the first vehicle meets the first trigger condition; and stopping reporting the map data in the manner instructed by the first instruction. The obtaining manner includes receiving the first trigger information from the network side device, or reading the first trigger information prestored in the first vehicle. The first trigger condition includes that a predetermined time is reached, a quantity of times of reporting the map data in the manner instructed by the first instruction exceeds a first threshold, or a quantity of samples of reporting the map data in the manner instructed by the first instruction exceeds a second threshold. Based on this solution, after determining that the first trigger condition is met, the first vehicle may stop, in time, reporting the map data in the manner instructed by the first instruction, to avoid data redundancy.

In a possible design, in addition to the constraint that the map data meets, the map data reporting manner instructed by the first instruction may further include at least one of the following: a data format, a reporting frame structure, a reporting frequency, a reporting time, a reporting priority, or a reporting rule. In other words, the first vehicle may report the map data by using a reporting indicator or the reporting rule specified by the network side device.

In a possible design, the first instruction is further used to instruct a second trigger condition that the first vehicle meets when the first vehicle starts to report the map data in the manner instructed by the first instruction, and before the sending the map data to the network side device, the method further includes: determining that the first vehicle meets the second trigger condition. For example, the second trigger condition may include: a data sample collected within a specified time is less than a threshold, a freshness value of a specified reporting object is less than a threshold, it is detected that a map element in a specified collection area is updated, and the like. Based on this solution, the first vehicle starts to report the map data in the manner instructed by the first instruction only when the second trigger condition is met. Therefore, map data collection pertinence is improved, and data redundancy is avoided.

In a possible design, the method further includes: obtaining freshness information of a collection object; and the sending the map data to the network side device includes: sending the map data to the network side device based on the freshness information. The freshness information is an average period in which the collection object changes, a statistical distribution status in which the collection object changes, duration in which the collection object does not change, and a first update time or a previous update time. The freshness information may be provided by a road side unit, a cloud network device, or another vehicle. The obtaining may be obtaining from the network side device, or may be obtaining from another device, for example, the road side unit, the cloud network device, or the another vehicle. For example, the sending the map data to the network side device based on the freshness information may be reflected in: determining a collection time frequency, a collection space density, a priority, or a reporting time of to-be-reported map data based on the freshness information, and sending, to the network side device, the map data that meets the collection time frequency, the collection space density, the priority, or the reporting time.

According to a second aspect, a map data collection method is provided. The method is applied to a network side device, and the method includes: sending a first instruction to a first vehicle, where the first instruction is used to instruct a map data reporting manner to the first vehicle, and the first instruction includes limitation information of map data reported by the first vehicle to the network side device; optionally, the limitation information may include confidence information, and the confidence information is used to indicate confidence that the map data reported by the first vehicle reaches; and optionally, the limitation information may include a collection area, a collection time frequency, a collection space density, a collection object, priority information, and a type, a specification, or a quantity of sensors used for collection of map data, that is, the first vehicle may perform collection by using a collection indicator specified by the network side device, or may perform collection on the collection object or at the collection area specified by the network side device, or perform collection by using a collection device specified by the network side device; and receiving, from the first vehicle, the map data that is sent by the first vehicle in the reporting manner instructed by the first instruction, where the map data meets a limitation of the limitation information on the reported map data, for example, when the limitation information is confidence information, confidence of the map data is not lower than the confidence indicated by the confidence information. Based on this solution, the map data reported by the vehicle to the network side device can be reduced, data redundancy can be avoided, and collection efficiency can be improved, thereby reducing complexity of subsequent data processing to some extent.

In a possible design, the method further includes: sending a second instruction to the first vehicle, where the second instruction is used to instruct the first vehicle to stop reporting map data in the manner instructed by the first instruction.

In a possible design, the method further includes: sending first trigger information to the first vehicle, where the first trigger information is used to indicate a first trigger condition that the first vehicle meets when the first vehicle stops reporting the map data in the manner instructed by the first instruction. The first trigger condition includes that a predetermined time is reached, a quantity of times of reporting the map data in the manner instructed by the first instruction exceeds a first threshold, or a quantity of samples of reporting the map data in the manner instructed by the first instruction exceeds a second threshold.

In a possible design, in addition to the constraint that the map data meets, the map data reporting manner instructed by the first instruction may further include at least one of the following: a data format, a reporting frame structure, a reporting frequency, a reporting time, a reporting priority, or a reporting rule. In other words, the first vehicle may report the map data by using a reporting indicator or the reporting rule specified by the network side device.

In a possible design, the first instruction is further used to instruct a second trigger condition that the first vehicle meets when the first vehicle starts to report the map data in the manner instructed by the first instruction. For example, the second trigger condition may include: a data sample collected within a specified time is less than a threshold, a freshness value of a specified reporting object is less than a threshold, it is detected that a map element in a specified collection area is updated, and the like.

In a possible design, the method further includes: sending freshness information of a collection object to the first vehicle, where the freshness information is used by the first vehicle to send the map data to the network side device. The freshness information is an average period in which the collection object changes, a statistical distribution situation in which the collection object changes, duration in which the collection object does not change, and a first update time or a previous update time. For example, that the freshness information is used by the first vehicle to send the map data to the network side device may be reflected in: determining a collection time frequency, a collection space density, a priority, or a reporting time of to-be-reported map data based on the freshness information, and sending, to the network side device, the map data that meets the collection time frequency, the collection space density, the priority, or the reporting time.

According to a third aspect, a map data collection apparatus is provided, configured to implement the foregoing methods. The map data collection apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a fourth aspect, a map data collection apparatus is provided, including at least one processor and a communications interface, where the communications interface is configured to communicate with another communications apparatus, and the processor is configured to run a computer program, so that the map data collection apparatus performs the method in any one of the first aspect or the possible designs of the first aspect, or the method in any one of the second aspect or the possible designs of the second aspect.

In a possible design, the communications apparatus further includes a memory. The memory is configured to store a computer program or instructions, and when the processor executes the instructions, the map data collection apparatus is enabled to perform the method according to any one of the foregoing aspects.

The map data collection apparatus may be applied to the first vehicle or the network side device. When the map data collection apparatus is applied to the first vehicle, the map data collection apparatus further includes a sensor, and the sensor is configured to obtain map data.

According to a fifth aspect, a map data collection apparatus is provided, including a processor. The processor is configured to: after being coupled to a memory and reading a computer program or instructions in the memory, perform the method in any one of the first aspect or the possible designs of the first aspect or the method in any one of the second aspect or the possible designs of the second aspect according to the computer program or the instructions.

In a possible design, the communications apparatus further includes the memory, and the memory is configured to store program instructions and data. When the communications apparatus is a chip system, the communications apparatus may include a chip, or may include a chip and another discrete component.

In the third aspect, the fourth aspect, or the fifth aspect, the map data collection apparatus may be the vehicle in the first aspect, the apparatus applied to the vehicle in the first aspect, or a chip or a chip system that can be used in the apparatus; or the map data collection apparatus may be the network side device in the second aspect, the apparatus applied to the network side device in the second aspect, or a chip or a chip system that can be used in the network side device in the second aspect.

According to a sixth aspect, a computer-readable storage medium is provided, where the computer-readable storage medium stores a computer program or instructions, and when the computer program or the instructions is/are executed by a processor, the method in any one of the foregoing aspects is implemented.

According to a seventh aspect, a computer program product including instructions is provided, where the computer program product includes the instructions, and when the computer program product runs on a computer, the computer is enabled to perform the method according to any one of the foregoing aspects.

According to an eighth aspect, a map data collection system is provided. The map data system includes the map data collection apparatus on a vehicle side and the map data collection apparatus on a network side.

For technical effects brought by any one of the designs of the third aspect to the eighth aspect, refer to technical effects brought by different designs of the first aspect and the second aspect. Details are not described herein again.

BRIEF DESCRIPTION OF DRAWINGS

To describe the technical solutions in embodiments of the present application or in the conventional technology more clearly, the following briefly describes the accompanying drawings for describing embodiments or the conventional technology.

FIG. 6(*b*) is a schematic diagram of a structure of a map data collection apparatus according to an embodiment of this application;

FIG. 6(*c*) is a schematic diagram of a structure of a map data collection apparatus according to an embodiment of this application;

FIG. 6(*d*) is a schematic diagram of a structure of a map data collection apparatus according to an embodiment of this application;

FIG. 6(*e*) is a schematic diagram of a structure of a map data collection apparatus according to an embodiment of this application.

DETAILED DESCRIPTION

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: only A exists, both A and B exist, and only B exists, where A and B may be singular or plural. In addition, in the descriptions of this application, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

In addition, in embodiments of this application, the words such as "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, use of the words such as "example" or "for example" is intended to present a relative concept in a specific manner for ease of understanding.

For ease of understanding, the following briefly describes application scenarios of embodiments of this application.

Figure 1:
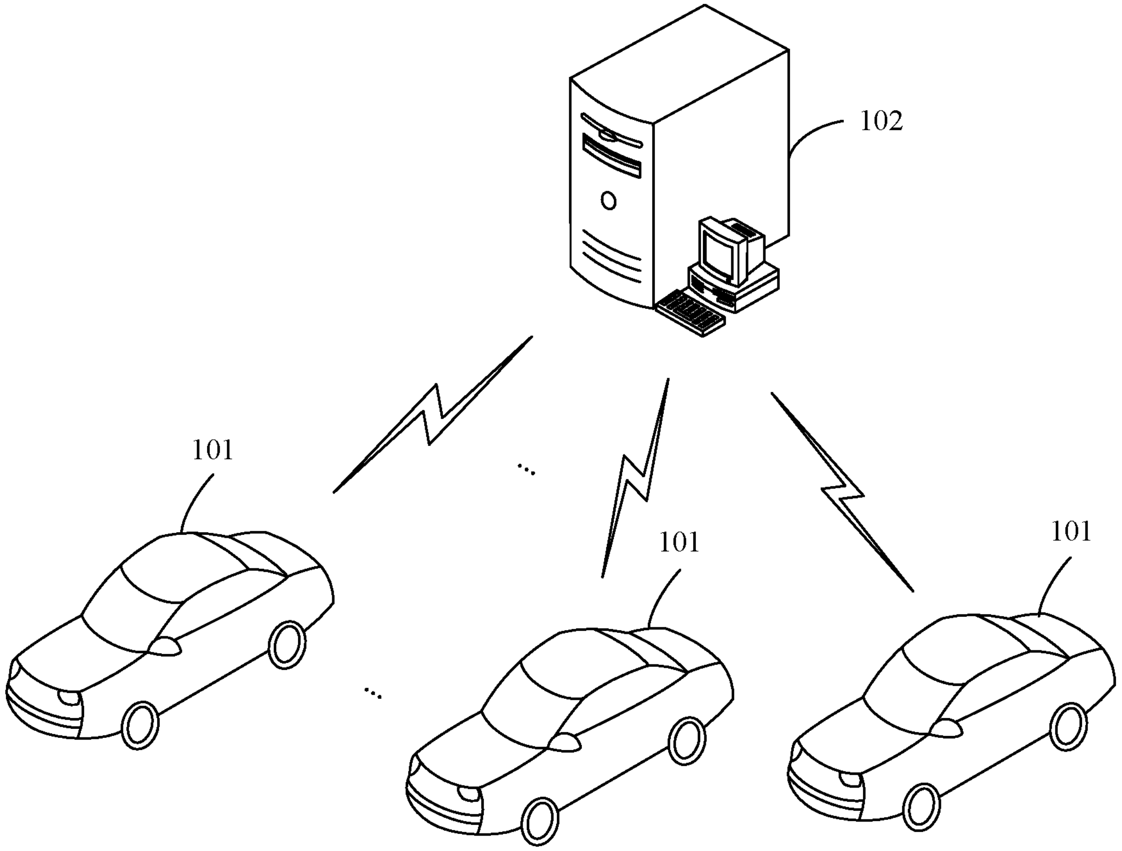
FIG. 1 is a diagram of an application scenario to which an embodiment of this application is applicable.

FIG. 1 is a possible diagram of an application scenario to which an embodiment of this application is applicable. As shown in FIG. 1, in the application scenario, a vehicle 101 may collect map data of an ambient environment by using collection devices equipped by the vehicle 101, such as an in-vehicle camera, a millimeter-wave radar, an ultrasonic radar, an acceleration sensor, or an angular velocity sensor, and report the map data to a network side device 102. The network side device 102 may receive the map data reported by the vehicle 101, further maintain or update a map based on the map data reported by the vehicle 101, and provide map update and download services for the vehicle 101. The network side device 102 includes but is not limited to a server, a road side unit (RSU), and the like.

The following describes the map data collection method provided in the embodiments of this application.

Figure 2:
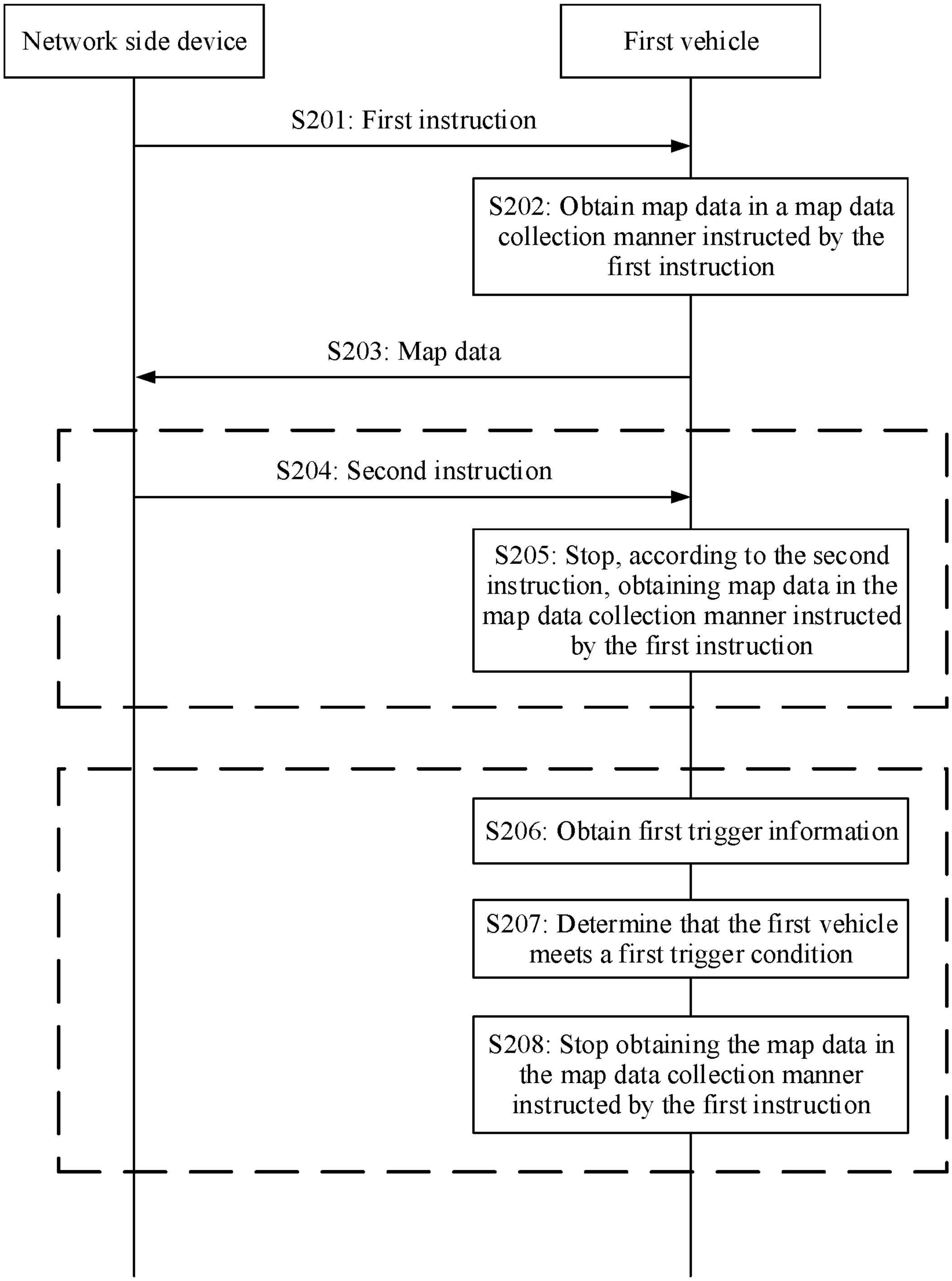
FIG. 2 is a schematic flowchart of a map data collection method according to an embodiment of this application.

FIG. 2 shows a map data collection method according to an embodiment of this application. The method includes the following steps.

At step S201: a network side device sends a first instruction to a first vehicle, and the first vehicle receives the first instruction from the network side device, where the first instruction is used to instruct a map data collection manner to the first vehicle.

The first vehicle is one or more vehicles in a service range of the network side device. The first instruction includes confidence information, and the confidence information is used to indicate confidence that map data reported by the vehicle reaches. The confidence may also be referred to as a confidence level, is used to represent precision of the map data, and may be represented by a probability value or any other value between (0, 1). A higher value indicates higher precision of the map data.

In this embodiment of this application, the map data collection manner instructed by the first instruction may include one or more of the following information: a collection time frequency, a collection space density, a collection priority, a collection freshness, a collection area, a collection priority, a collection object, a collection object type, a sensor type, a sensor specification, or a sensor quantity.

For example, in a possible implementation, the map data collection manner instructed by the first instruction may include a collection object. The collection object may be, for example, a specific element (also referred to as a map element) that forms a map, like a lane line, a speed limit sign, a street lamp, a road sign, a traffic light, or a stop line. In other words, the first instruction may instruct the first vehicle to perform collection on the specified collection object. Alternatively, the map data collection manner instructed by the first instruction may include the collection object type. The collection object type may be, for example, a roadside facility, a road surface sign line, a road construction sign, or a roadside sign. Each classification further includes a plurality of map elements. For example, the road surface sign line may include a lane line, a stop line, a deceleration mark line, a stop line, and the like. In other words, the first instruction may instruct the first vehicle to perform collection on the collection object of the specified type. Alternatively, the map data collection manner instructed by the first instruction may include a collection area. The collection area may be, for example, a road or a lane on the map, or may be an administrative region (for example, a provincial jurisdiction, a municipal jurisdiction, or a county jurisdiction) on the map, or may be another area in any range specified by the network side device. In other words, the first instruction may instruct the first vehicle to perform collection in the specified collection area. Certainly, the map data collection manner instructed by the first instruction may alternatively include a collection area and a collection object, or include a collection area and a collection type. In other words, the first instruction may instruct the first vehicle to collect a specified collection object in a specified area or a specified type of collection object in a specified area.

In another possible implementation, the map data collection manner instructed by the first instruction may include one or more collection indicators such as a collection time frequency, a collection space density, a collection priority, collection freshness, and a collection priority. In other words, the first instruction may instruct the first vehicle to perform collection by using a specified collection indicator. Alternatively, the map data collection manner instructed by the first instruction may include a collection indicator and a collection object. In other words, the first instruction may instruct the first vehicle to perform collection on the specified collection object by using a specified collection indicator. Alternatively, the map data collection manner instructed by the first instruction may include a collection indicator and a collection area. In other words, the first instruction may instruct the first vehicle to collect the collection object in a specified collection area by using a specified collection indicator.

In yet another possible implementation, the map data collection manner instructed by the first instruction may include a sensor type, a sensor specification, or a sensor quantity. In other words, the first instruction may instruct the first vehicle to perform collection based on a specified type or quantity of collection devices.

Certainly, only some possible implementations of the map data collection manner are listed above. It may be understood that the map data collection manner may alternatively be in another form. This is not specifically limited in this application.

In addition, it should be noted that the freshness in this embodiment of this application represents a change frequency of the collection object or the collection area. In a possible implementation, a freshness value may be used to represent freshness of the collection object or the collection area, and the freshness value is used to represent a change period of the map element.

For example, the freshness value may be defined as a real number at an interval of 0.5 between [0.5, 5.5]. When the freshness value is 1.5, it indicates that a change period of a corresponding map element is 1.5 years, 1.5 months, 1.5 weeks, or 1.5 days. Certainly, the foregoing is merely an illustrative example. In an exemplary implementation, the freshness value may be represented in another manner. This is not specifically limited in this application.

In addition, the freshness value in this embodiment of this application may be that each map element corresponds to one freshness value, or that a plurality of map elements correspond to one freshness value, or that all map elements on a road in a map correspond to one average freshness value, or even that all map elements in a region, an area, or a city correspond to one average freshness value. This is not specifically limited herein. In other words, the freshness value in this embodiment of this application may be used to limit a map element, or may be used to limit several map elements, or may be used to limit a map element in a region, an area, or a city. This is not specifically limited in this application.

In this embodiment of this application, collecting the map data by using the specified collection freshness may be collecting the map data by using a collection level corresponding to a specified collection freshness value. In a possible implementation, a correspondence between the freshness value and the collection level may be preset, so that freshness values in different value ranges correspond to different collection levels.

For example, each collection level may include a corresponding collection density and/or collection frequency. Collecting the map data by using the specified freshness value is equivalent to collecting the map data by using a collection density and/or a collection frequency corresponding to the specified freshness. Optionally, a collection level corresponding to a relatively large freshness value may be referred to as a basic collection level. The basic collection level may include a specified collection density and/or collection frequency. Collection levels above the basic collection level respectively correspond to freshness values in different value ranges. As the collection level increases, the corresponding collection density and/or collection frequency may gradually increase by using the specified collection density and/or collection frequency as a reference. For example, Table 1 shows an example of a correspondence between a freshness value and a collection level. In Table 1, when a freshness value is between [4.5, 5.5), the freshness value corresponds to a collection level 1, which is also referred to as a basic collection level. When a freshness value is between [2.5, 4.5), the freshness value corresponds to a collection level 2, and the collection frequency and/or the collection density increases by 1 on the basis of the basic collection level. When a freshness value is between [0.5, 2.5), the freshness value corresponds to a collection level 3, and the collection frequency and/or the collection density increases by 2 on the basis of the basic collection level.

TABLE 1

| Freshness value | Collection level |
|---|---|
| [0.5, 2.5) | 3 (collection frequency and/or collection density + 2) |
| [2.5, 4.5) | 2 (collection frequency and/or collection density + 1) |
| [4.5, 5.5) | 1 (basic collection level) |

Optionally, the first instruction may further include freshness information of at least one collection object.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. The freshness information is information that can be used to predict a possible change of the collection object. For example, the freshness information may be, for example, at least one of the following information: an average change period, a first update time, a previous update time, or no-change duration.

Optionally, the first instruction may further include a second trigger condition that the first vehicle meets when the first vehicle starts to collect the map data in the manner instructed by the first instruction. For example, the second trigger condition may include: a data sample collected within a specified time is less than a threshold, a freshness value of a specified collection object is less than a threshold, it is detected that a map element in a specified collection area is updated, and the like.

Optionally, in this embodiment of this application, the first instruction may further include a collection condition that the collection vehicle meets. The collection condition that the vehicle meets may include at least one of the following information: a vehicle speed, a lane in which the vehicle is located, a quantity of equipped sensors, a specification of the equipped sensors, confidence information of the equipped sensors, a quantity of equipped radars, a specification of the equipped radars, a quantity of equipped cameras, or the like. This is not specifically limited in this embodiment of this application.

At step S202: the first vehicle obtains the map data in the map data collection manner instructed by the first instruction.

Optionally, when the first instruction further includes the second trigger condition, step S202 includes: when determining that the second trigger condition is met, the first vehicle obtains the map data in the map data collection manner instructed by the first instruction. In this way, the first vehicle starts to collect the map data in the manner instructed by the first instruction only when the second trigger condition is met. Therefore, data redundancy can be avoided.

For example, that the first vehicle obtains the map data in the map data collection manner instructed by the first instruction may be, for example, when the map data collection manner instructed by the first instruction includes a collection object, the first vehicle collects a specified collection object to obtain the map data. For another example, alternatively, when the map data collection manner instructed by the first instruction includes the collection object type, the first vehicle collects the collection object of the specified type to obtain the map data. For another example, when the map data collection manner instructed by the first instruction includes the collection area, the first vehicle collects the specified collection area to obtain the map data.

Optionally, when the first instruction includes the freshness information of the at least one collection object, that the first vehicle obtains the map data in the map data collection manner instructed by the first instruction includes: the first vehicle predicts, based on the freshness information, that one or more collection objects are about to change; and the first vehicle collects the one or more collection objects, to obtain the map data.

In a possible implementation, that the first vehicle predicts, based on the freshness information, that a collection object is about to change may include: when a time interval between a first update time of a collection object and a current time is greater than or equal to first duration, the first vehicle predicts that the collection object is about to change; or when a time interval between a previous update time of a collection object and a current time is greater than or equal to second duration, the first vehicle predicts that the collection object is about to change; or when duration without change of a collection object is greater than or equal to third duration, the first vehicle predicts that the collection object is about to change; or when a time interval between duration without change of a collection object and an average change period is less than or equal to fourth duration, the first vehicle predicts that the collection object is about to change.

Optionally, in this embodiment of this application, when the first instruction includes the collection condition that the collection vehicle meets, that the first vehicle obtains the map data in the map data collection manner instructed by the first instruction includes: after determining that the first vehicle meets the collection condition, the first vehicle obtains the map data in the map data collection manner instructed by the first instruction.

In this way, only a vehicle that meets a collection condition can collect map data, and then report the map data to the network side device. This can avoid a problem that reliability of map data reported by some crowdsourced vehicles to the network side device is low because performance of collection devices equipped with the crowdsourced vehicles is relatively poor. In other words, based on this solution, crowdsourced vehicles that do not meet the collection condition can be filtered out, thereby ensuring reliability of map data reported by crowdsourced vehicles with uneven layers.

At step S203: the first vehicle sends the map data to the network side device, and the network side device receives the map data from the first vehicle.

The map data sent by the first vehicle to the network side device is map data obtained by the first vehicle in the map data collection manner instructed by the first instruction, and confidence of the map data is not lower than the confidence indicated by the confidence information included in the first instruction. In this embodiment of this application, after receiving the first instruction from the network side device, the first vehicle may collect the map data in the map data collection manner instructed by the first instruction, and further delete, from the collected map data based on the confidence information in the first instruction, map data whose confidence does not meet a requirement (that is, the map data whose confidence is lower than the confidence indicated by the confidence information), and then send the map data to the network side device. Therefore, the confidence of the map data sent by the first vehicle to the network side device is not lower than the confidence indicated by the confidence information. In this way, the first vehicle can be prevented from reporting map data with relatively low precision to the network side device, thereby ensuring reliability of the map data used by the network side device to update a map, and further improving map accuracy.

In this embodiment of this application, the network side device may send the first instruction to the first vehicle, and the first instruction may instruct the map data collection manner to the first vehicle. After receiving the first instruction, the first vehicle may collect the map data in the targeted manner in the map data collection manner instructed by the first instruction, to obtain the map data. Therefore, it can be avoided that a relatively large amount of time is spent on collecting map data in an area with relatively small vehicle traffic, and a collection time of the area with relatively small vehicle traffic can be shortened, thereby improving collection efficiency. In addition, map data redundancy in an area with relatively large vehicle traffic can be avoided, thereby reducing a data amount of map data received by the network side device, and reducing complexity of subsequent data processing to some extent.

Optionally, as shown in FIG. 2, the map data collection method provided in this embodiment of this application may further include the following steps S204 and S205.

At step S204: the network side device sends a second instruction to the first vehicle, and the first vehicle receives the second instruction from the network side device.

The second instruction is used to instruct the first vehicle to stop collecting map data in the manner instructed by the first instruction.

At step S205: the first vehicle stops, according to the second instruction, obtaining map data in the map data collection manner instructed by the first instruction.

Optionally, after the vehicle stops obtaining the map data in the map data collection manner instructed by the first instruction, the collection object may be collected in a default collection manner.

Alternatively, optionally, in addition to the foregoing manner of instructing, by using the second instruction, the first vehicle to stop obtaining the map data in the map data collection manner instructed by the first instruction, an objective of instructing, by using trigger information, the first vehicle to stop collecting the map data in the manner instructed by the first instruction may be achieved. For example, trigger information may be carried in the first instruction, and the trigger information is used to indicate a trigger condition that the vehicle meets when the vehicle stops collecting the map data in the manner instructed by the first instruction. In this case, as shown in FIG. 2, the map data collection method provided in this embodiment of this application may further include the following steps S206 to S208.

At step S206: the first vehicle obtains first trigger information.

The first trigger information is used to indicate a first trigger condition that the first vehicle meets when the first vehicle stops collecting the map data in the manner instructed by the first instruction. For example, the first vehicle may prestore the first trigger information. In this way, the first trigger information can be obtained through reading of prestored information. Alternatively, the network side device may add the first trigger information to the first instruction. In this way, the first vehicle can obtain the first trigger information after receiving the first instruction from the network side device.

The first trigger condition may include one or more of the following: a predetermined time is reached, a quantity of times of collecting data in the map data collection manner instructed by the first instruction exceeds a first threshold, a quantity of data samples collected in the map data collection manner instructed by the first instruction exceeds a third threshold, or a freshness value of a specified collection object exceeds a fifth threshold.

It should be understood that, in this embodiment of this application, when the first vehicle indicates a plurality of vehicles, the quantity of sample points is a quantity of sample points obtained through joint collection by all the first vehicles, and the quantity of collection times is an accumulated quantity of collection times performed by all the first vehicles. The specified quantity of times and the first threshold may be predefined, or may be specified by the network side device, maintained by the network side device, and sent to the first vehicle. This is not specifically limited in this embodiment of this application.

At step S207: the first vehicle determines that the first vehicle meets the first trigger condition.

At step S208: the first vehicle stops obtaining the map data in the map data collection manner instructed by the first instruction.

In the foregoing embodiment of this application, the first vehicle may stop, in time based on an instruction of the network side device or based on the obtained trigger information, obtaining the map data in the map data collection manner instructed by the first instruction, to avoid resource waste and data redundancy caused by performing an unnecessary collection operation.

Figure 3:
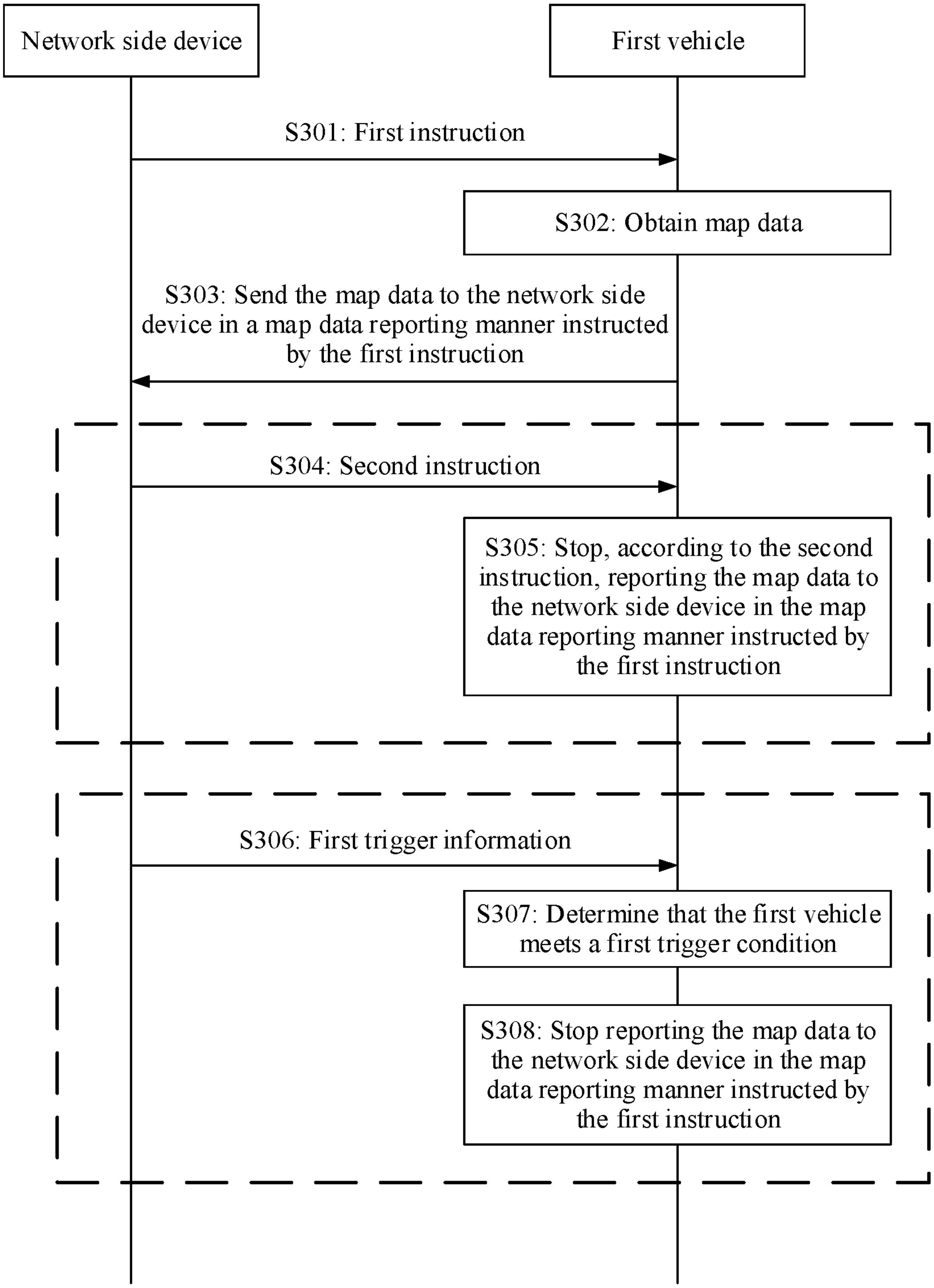
FIG. 3 is a schematic flowchart of another map data collection method according to an embodiment of this application.

FIG. 3 shows another map data collection method according to an embodiment of this application. The method includes the following steps.

At step S301: a network side device sends a first instruction to a first vehicle, and the first vehicle receives the first instruction from the network side device, where the first instruction is used to instruct a map data reporting manner to the first vehicle.

The first vehicle is one or more vehicles in a service range of the network side device. The first instruction includes confidence information, and the confidence information is used to indicate confidence that map data reported by the vehicle reaches. For explanations of the confidence information, refer to related descriptions in the embodiment shown in FIG. 2. Details are not described herein again.

In a possible implementation, the map data reporting manner instructed by the first instruction may include a reporting indicator, and the reporting indicator may include, for example, at least one of the following: a reporting frequency, a reporting time, a data format, a reporting frame structure, a reporting priority, and the like.

In another possible implementation, the map data reporting manner instructed by the first instruction may include a reporting rule. For example, the reporting rule may be: reporting whenever the first vehicle collects map data corresponding to a collection object or a collection area, or reporting when a time in which the first vehicle receives the first instruction exceeds specified duration, or reporting when a quantity of data samples collected by the first vehicle exceeds a threshold, or reporting when a quantity of data samples reported by the first vehicle in the map data reporting manner instructed by the first instruction exceeds a threshold.

Optionally, the first instruction may further include a second trigger condition used to trigger the first vehicle to start to report the map data in the manner instructed by the first instruction. For example, the second trigger condition may include: a data sample collected within a specified time is less than a threshold, a freshness value of a specified reporting object is less than a threshold, it is detected that a map element in a specified collection area is updated, and the like.

At step S302: the first vehicle obtains the map data.

The first vehicle may collect the map data in a default manner (for example, a crowdsourcing collection mode) or another manner (the manner in the embodiment shown in FIG. 2) to obtain the map data. This is not specifically limited in this embodiment of this application.

At step S303: the first vehicle sends the map data to the network side device in the map data reporting manner instructed by the first instruction, and the network side device receives the map data from the first vehicle.

The confidence of the map data sent by the first vehicle to the network side device is not lower than the confidence indicated by the confidence information included in the first instruction. In this embodiment of this application, after collecting the map data, the first vehicle may delete, from the collected map data based on the confidence information in the first instruction, map data whose confidence does not meet a requirement (that is, map data whose confidence is lower than the confidence indicated by the confidence information), and then send the map data to the network side device. Therefore, the confidence of the map data sent by the first vehicle to the network side device is not lower than the confidence indicated by the confidence information. In this way, the first vehicle can be prevented from reporting map data with relatively low precision to the network side device, thereby ensuring reliability of the map data used by the network side device to update a map, and further improving map accuracy.

Optionally, when the first instruction further includes the second trigger condition, step S303 includes: when determining that the second trigger condition is met, the first vehicle sends the map data to the network side device in the map data reporting manner instructed by the first instruction. In this way, the first vehicle starts to report the map data in the manner instructed by the first instruction only when the second trigger condition is met. Therefore, data redundancy can be avoided.

In a possible implementation, if the map data reporting manner instructed by the first instruction includes the reporting indicator, the first vehicle may send the map data to the network side device based on the reporting indicator included in the first instruction, for example, send the map data to the network side device at a specified reporting frequency, send the map data to the network side device at a specified reporting time, or send the map data to the network side device in a specified data format.

In another possible implementation, if the map data reporting manner instructed by the first instruction includes the reporting rule, the first vehicle may send the map data to the network side device according to the reporting rule included in the first instruction.

In this embodiment of this application, the network side device may send the first instruction to the first vehicle, and the first instruction includes a manner used to instruct the first vehicle to report map data. After receiving the first instruction, the first vehicle may report the map data in a targeted manner in the map data reporting manner instructed by the first instruction. Therefore, the map data reported by the vehicle to the network side device can be reduced, data redundancy can be avoided, and collection efficiency can be improved, thereby reducing complexity of subsequent data processing to some extent.

Optionally, the map data collection method provided in this embodiment of this application may further include the following steps: the network side device sends the freshness information of the collection object to the first vehicle; and the first vehicle obtains the freshness information of the collection object.

The freshness information is used by the first vehicle to send the map data to the network side device. In a possible implementation, the network side device may send the freshness information of the collection object to the first vehicle by using the first instruction, that is, the freshness information of the collection object may be included in the first instruction. After receiving the first instruction, the first vehicle may obtain the freshness information of the collection object in the first instruction.

Correspondingly, that the first vehicle sends the map data to the network side device may include: the first vehicle sends the map data to the network side device based on the freshness information of the collection object. For example, when predicting, based on the freshness information, that one or more collection objects are about to change, the first vehicle may collect the one or more collection objects to obtain map data, and further send, to the network side device, map data that meets the confidence information requirement. For a method for predicting, by the first vehicle based on the freshness information, that the one or more collection objects are about to change, refer to related descriptions in the embodiment shown in FIG. 2. Details are not described herein again.

Optionally, as shown in FIG. 3, the map data collection method provided in this embodiment of this application may further include the following steps S304 and S305.

At step S304: the network side device sends a second instruction to the first vehicle, and the first vehicle receives the second instruction from the network side device.

The second instruction is used to instruct the first vehicle to stop reporting map data in the manner instructed by the first instruction.

At step S305: the first vehicle stops, according to the second instruction, reporting the map data to the network side device in the map data reporting manner instructed by the first instruction.

Optionally, in addition to the foregoing manner of instructing, by using the second instruction, the first vehicle to stop sending the map data to the network side device in the map data reporting manner instructed by the first instruction, an objective of instructing, by using trigger information, the first vehicle to stop reporting the map data in the manner instructed by the first instruction may be achieved. For example, trigger information may be carried in the first instruction, and the trigger information is used to indicate a trigger condition that the vehicle meets when the vehicle stops reporting the map data in the manner instructed by the first instruction. In this case, as shown in FIG. 3, the map data collection method provided in this embodiment of this application may further include the following steps S306 to S308.

At step S306: the network side device sends first trigger information to the first vehicle, and the first vehicle receives the first trigger information.

The first trigger information is used to indicate a first trigger condition that the first vehicle meets when the first vehicle stops reporting the map data in the manner instructed by the first instruction.

Optionally, the network side device may alternatively add the first trigger information to the first instruction and send the first trigger information to the first vehicle. In this way, the first vehicle can obtain the first trigger information after receiving the first instruction from the network side device.

The first trigger condition may include: a predetermined time is reached, a quantity of times of reporting data in the map data reporting manner instructed by the first instruction exceeds a second threshold, a quantity of data samples reported in the map data reporting manner instructed by the first instruction exceeds a fourth threshold, or a freshness value of a specified reporting object exceeds a fifth threshold.

At step S307: the first vehicle determines that the first vehicle meets the first trigger condition.

At step S308: the first vehicle stops reporting the map data to the network side device in the map data reporting manner instructed by the first instruction.

In the foregoing embodiment of this application, the first vehicle may stop, in time based on an instruction of the network side device or based on the obtained trigger information, reporting the map data in the map data collection manner instructed by the first instruction, to avoid resource waste and data redundancy caused by performing an unnecessary reporting operation.

It may be understood that, in the foregoing embodiments, the methods and/or steps implemented by the first vehicle may also be implemented by a component that can be used in the first vehicle, and the methods and/or steps implemented by the network side device may also be implemented by a component that can be used in the network side device.

Figure 4:
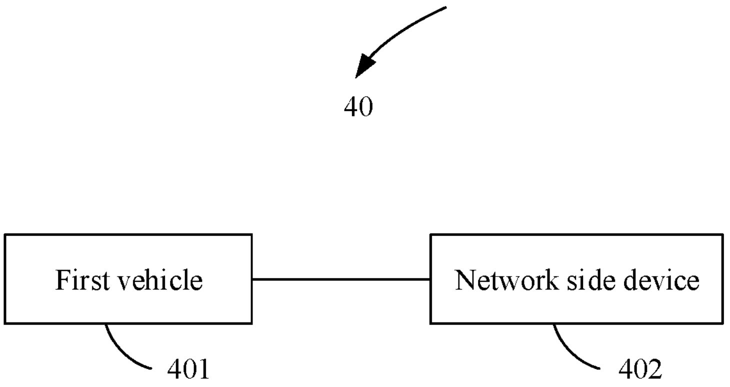
FIG. 4 is a schematic diagram of a structure of a map data collection system according to an embodiment of this application.

Based on the foregoing method embodiments, an embodiment of this application provides a map data collection system 40. As shown in FIG. 4, the map data collection system 40 includes a first vehicle 401 and a network side device 402, and the first vehicle 401 and the network side device 402 may communicate with each other.

The first vehicle 401 is configured to perform an action of the first vehicle in the embodiment shown in FIG. 2 or FIG. 3. The network side device 402 is configured to perform actions of the network side device in the embodiment shown in FIG. 2 or FIG. 3.

Optionally, a related function of the first vehicle 401 or the network side device 402 in this embodiment of this application may be implemented by one device, or may be jointly implemented by a plurality of devices, or may be implemented by one or more functional modules in one device. This is not specifically limited in this embodiment of this application. It may be understood that the foregoing function may be a network element in a hardware device, may be a software function running on dedicated hardware, a combination of hardware and software, or a virtualization function instantiated on a platform (for example, a cloud platform).

Figure 5:
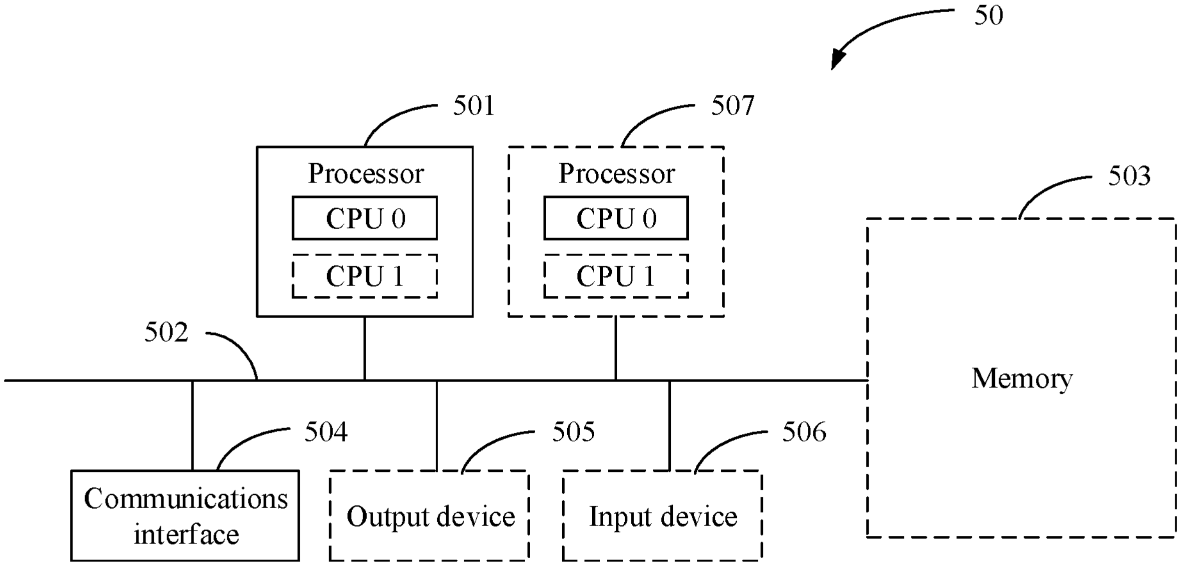
FIG. 5 is a schematic diagram of a structure of a map data collection apparatus according to an embodiment of this application.
Figure 6A:
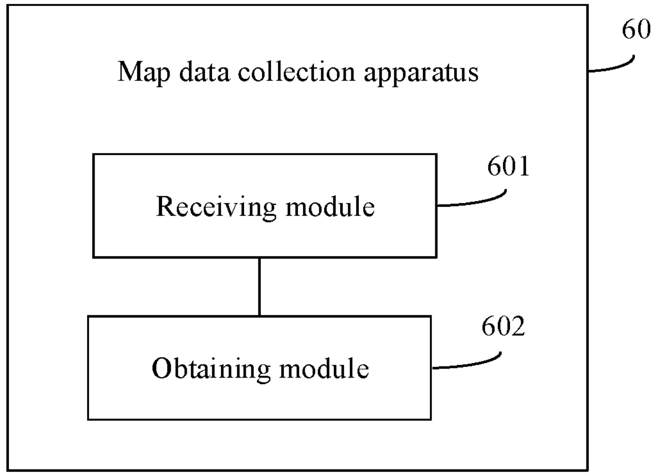
FIG. 6(*a*) is a schematic diagram of a structure of a map data collection apparatus according to an embodiment of this application.
Figure 6B:
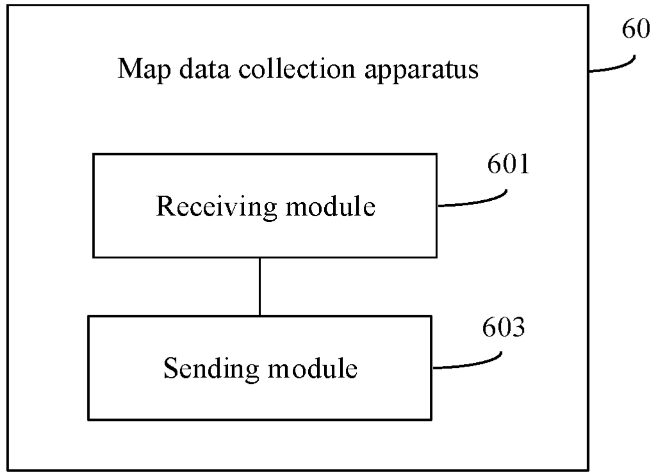
Figure 6C:
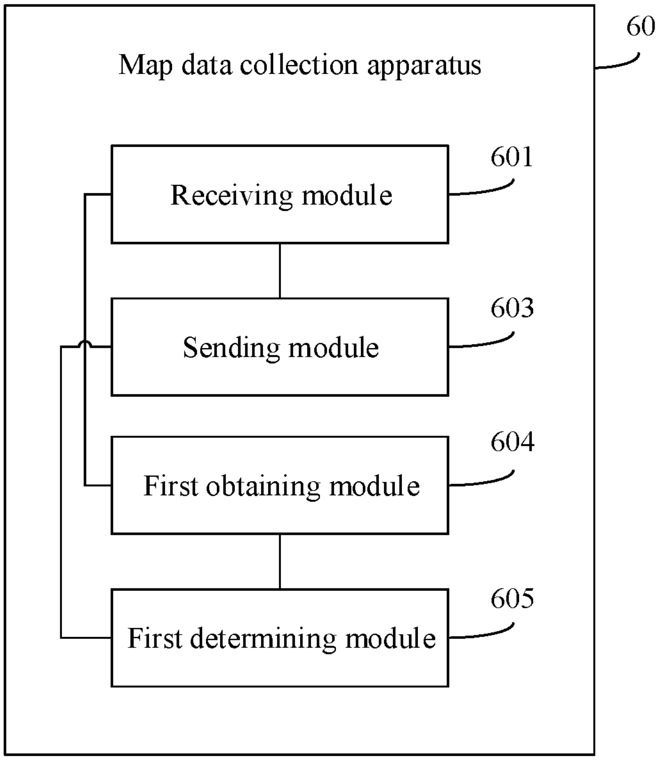
Figure 6D:
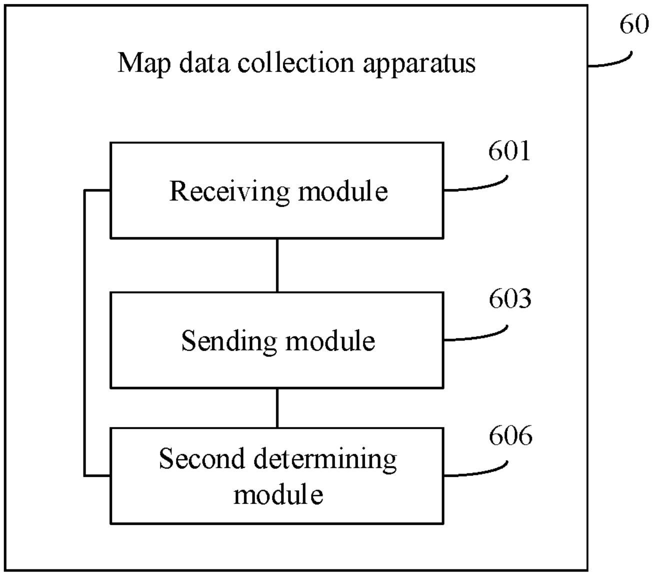
Figure 6E:
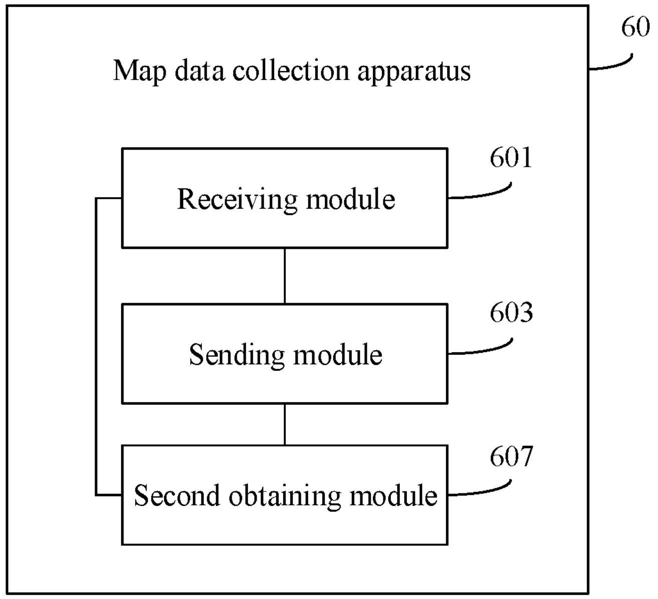

For example, a related function of the first vehicle 401 or the network side device 402 in this embodiment of this application may be implemented by using the map data collection apparatus 50 in FIG. 5. FIG. 5 is a schematic diagram of a structure of a map data collection apparatus 50 according to an embodiment of this application. The map data collection apparatus 50 includes one or more processors 501, a communications line 502, and at least one communications interface (FIG. 5 uses only an example in which a communications interface 504 and one processor 501 are included for description). Optionally, the map data collection apparatus 50 may further include a memory 503.

The processor 501 may be a general central processing unit (CPU), a microprocessor, an application-specific integrated circuit (ASIC), or one or more integrated circuits configured to control program execution of the solutions of this application.

The communications line 502 may include a channel, and is configured to connect different components.

The communications interface 504 may be a transceiver module configured to communicate with another device or a communications network like the Ethernet, a radio access network (RAN), or a wireless local area network (WLAN). For example, the transceiver module may be an apparatus like a transceiver or a transceiver. Optionally, the communications interface 504 may alternatively be a transceiver circuit located inside the processor 501, and is configured to implement signal input and signal output of the processor.

The memory 503 may be an apparatus having a storage function. For example, the memory 503 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic storage medium or another magnetic storage device, or any other medium that can be used to carry or store expected program code in a form of an instruction or a data structure and that can be accessed by a computer. However, this is not limited thereto. The memory may exist independently, and connect to the processor over the communications line 502. The memory may alternatively be integrated with the processor.

The memory 503 is configured to store computer-executable instructions for executing the solutions in this application, and execution is controlled by the processor 501. The processor 501 is configured to execute the computer executable instruction stored in the memory 503, to implement the map data collection method provided in the embodiments of this application.

Alternatively, in this embodiment of this application, the processor 501 may perform processing-related functions in the map data collection method provided in the following embodiments, and the communications interface 504 is responsible for communication with another device or a communications network. This is not specifically limited in this embodiment of this application.

The computer-executable instructions in this embodiment of this application may also be referred to as application program code. This is not specifically limited in this embodiment of this application.

In an exemplary implementation, in an embodiment, the processor 501 may include one or more CPUs, for example, a CPU 0 and a CPU 1 in FIG. 5.

During an exemplary implementation, in an embodiment, the map data collection apparatus 50 may include a plurality of processors, for example, the processor 501 and a processor 507 in FIG. 5. Each of the processors may be a single-core (single-CPU) processor, or may be a multi-core (multi-CPU) processor. The processor herein may be one or more devices, circuits, and/or processing cores configured to process data (for example, computer program instructions).

During an exemplary implementation, in an embodiment, the map data collection apparatus 50 may further include an output device 505 and an input device 506. The output device 505 communicates with the processor 501, and may display information in a plurality of manners.

The map data collection apparatus 50 may be a general-purpose apparatus or a dedicated apparatus. This is not specifically limited in embodiments of this application.

It may be understood that the actions of the network side device or the first vehicle in steps S201 to S206 in the method embodiment shown in FIG. 2 may be performed by the processor 501 in the map data collection apparatus 50 shown in FIG. 5 by invoking the application program code stored in the memory 503. Similarly, the actions of the network side device or the first vehicle in steps S301 to S306 in the method embodiment shown in FIG. 3 may be performed by the processor 501 in the map data collection apparatus 50 shown in FIG. 5 by invoking the application program code stored in the memory 503. This is not limited in this embodiment.

In addition, an embodiment of this application further provides a map data collection apparatus. The map data collection apparatus may be an apparatus applied to the first vehicle in the foregoing method embodiment, or a component that can be applied to the first vehicle. Alternatively, the map data collection apparatus may be the network side device in the foregoing method embodiments, or an apparatus including the foregoing network side device, or a component that can be used in the foregoing network side device. It may be understood that, to implement the foregoing functions, the map data collection apparatus includes a corresponding hardware structure and/or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, the map data collection apparatus is an apparatus applied to the first vehicle in the foregoing method embodiment. FIG. 6(*a*) is a possible schematic diagram of a structure of the map data collection apparatus 60. As shown in FIG. 6(*a*), the map data apparatus 60 includes a receiving module 601 and an obtaining module 602.

The receiving module 601 is configured to receive a first instruction from a network side device, where the first instruction is used to instruct a map data collection manner to a first vehicle.

The obtaining module 602 is configured to obtain map data in the map data collection manner instructed by the first instruction.

FIG. 6(*b*) is another possible schematic diagram of a structure of the map data collection apparatus 60. As shown in FIG. 6(*b*), the map data apparatus 60 includes a receiving module 601 and a sending module 603.

The receiving module 601 is configured to receive a first instruction from a network side device, where the first instruction is used to instruct a map data reporting manner to a first vehicle.

The sending module 603 is configured to send the map data to the network side device in the map data reporting manner instructed by the first instruction.

The first instruction includes confidence information, and the confidence information is used to indicate confidence that the map data reported by the first vehicle reaches. The confidence of the map data sent by the sending module 603 to the network side device is not lower than the confidence indicated by the confidence information.

Optionally, the receiving module 601 is further configured to receive a second instruction from the network side device, where the second instruction is used to instruct the first vehicle to stop reporting map data in the manner instructed by the first instruction. The obtaining module 602 is further configured to stop, according to the second instruction, collecting the map data in the manner instructed by the first instruction. Alternatively, the sending module 603 is further configured to stop, according to the second instruction, reporting the map data in the manner instructed by the first instruction.

Optionally, as shown in FIG. 6(*c*), the map data collection apparatus 60 may further include a first obtaining module 604 and a first determining module 605. The first obtaining module 604 is configured to obtain first trigger information, where the first trigger information is used to indicate a first trigger condition that the first vehicle meets when the first vehicle stops reporting the map data in the manner instructed by the first instruction. The first determining module 605 is configured to determine that the first vehicle meets the first trigger condition. The sending module 603 is further configured to stop reporting the map data in the manner instructed by the first instruction.

Optionally, the first instruction is further used to instruct a second trigger condition that the first vehicle meets when the first vehicle starts to report the map data in the manner instructed by the first instruction. As shown in FIG. 6(*d*), the map data collection apparatus 60 may further include a second determining module 606, configured to determine that the first vehicle meets the second trigger condition.

Optionally, as shown in FIG. 6(*e*), the map data collection apparatus 60 may further include a second obtaining module 607, configured to obtain freshness information of a collection object. The sending module 603 is further configured to send the map data to the network side device based on the freshness information.

All related content of the steps in the foregoing method embodiments may be cited in function descriptions of the corresponding functional modules. Details are not described herein again.

In this embodiment, the map data collection apparatus 60 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the map data collection apparatus 60 may be in a form of the map data collection apparatus 50 shown in FIG. 5.

For example, the processor 501 in the map data collection apparatus 50 shown in FIG. 5 may invoke the computer executable instruction stored in the memory 503, so that the map data collection apparatus 50 performs the map data collection method in the foregoing method embodiment.

For example, functions/implementation processes of the foregoing modules may be implemented by the processor 501 in the map data collection apparatus 50 shown in FIG. 5 by invoking the computer executable instruction stored in the memory 503.

Because the map data collection apparatus 60 provided in this embodiment may execute the foregoing map data collection method, for a technical effect that can be achieved by the map data collection apparatus 60, refer to the foregoing method embodiment. Details are not described herein again.

Figure 7:
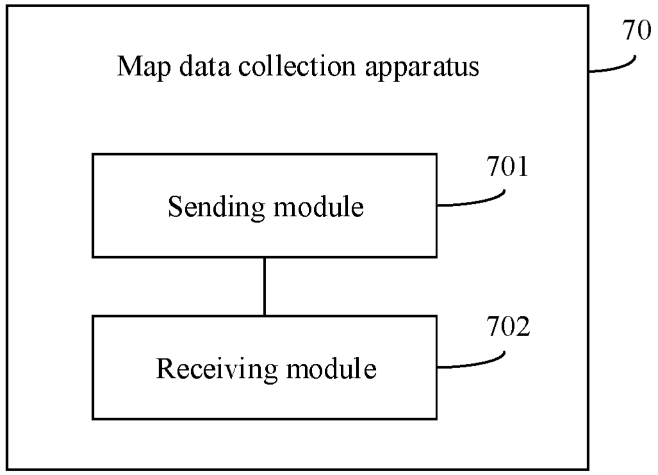
FIG. 7 is a schematic diagram of a structure of a map data collection apparatus according to an embodiment of this application.

Alternatively, an example in which the map data collection apparatus is applied to the network side device in the foregoing method embodiment is used. FIG. 7 is a schematic diagram of a structure of a map data collection apparatus 70. As shown in FIG. 7, the map data collection apparatus 70 includes a sending module 701 and a receiving module 702.

The sending module 701 is configured to send a first instruction to a first vehicle, where the first instruction includes a map data reporting manner used to be indicated to the first vehicle, the first instruction includes confidence information, and the confidence information is used to indicate confidence that map data reported by the first vehicle reaches.

The receiving module 702 is configured to receive, from the first vehicle, the map data that is sent by the first vehicle in the map data reporting manner instructed by the first instruction, where confidence of the map data is not lower than the confidence indicated by the confidence information.

Optionally, the sending module 701 is further configured to send a second instruction to the first vehicle, where the second instruction is used to instruct the first vehicle to stop reporting the map data in the manner instructed by the first instruction.

Optionally, the sending module 701 is further configured to send first trigger information to the first vehicle, where the first trigger information is used to indicate a first trigger condition that the first vehicle meets when the first vehicle stops reporting the map data in the manner instructed by the first instruction.

Optionally, the first instruction is further used to instruct a second trigger condition that the first vehicle meets when the first vehicle starts to report the map data in the manner instructed by the first instruction.

Optionally, the sending module 701 is further configured to send freshness information of the collection object to the first vehicle, where the freshness information is used by the first vehicle to send the map data to the network side device.

In this embodiment, the map data collection apparatus 70 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the map data collection apparatus 70 may be in a form of the map data collection apparatus 50 shown in FIG. 5.

For example, functions/implementation processes of the sending module 701 and the receiving module 702 may be implemented by the processor 501 in the map data collection apparatus 50 shown in FIG. 5 by invoking the computer executable instruction stored in the memory 503. Alternatively, functions/implementation processes of the sending module 701 and the receiving module 702 may be implemented by using the communications interface 504 in the map data collection apparatus 50 shown in FIG. 5.

Because the map data collection apparatus 70 provided in this embodiment may execute the foregoing map data collection method, for a technical effect that can be achieved by the map data collection apparatus 70, refer to the foregoing method embodiment. Details are not described herein again.

It should be noted that one or more of the foregoing modules or units may be implemented by using software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a system-on-a-chip (SoC) or an ASIC, or may be an independent semiconductor chip. In addition to a core for executing software instructions to perform operations or processing, the processor may further include a hardware accelerator, for example, a field programmable gate array (FPGA), a programmable logic device (PLD), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run software or does not depend on software to perform the foregoing method procedures.

Optionally, an embodiment of this application further provides a map data collection apparatus (for example, the map data collection apparatus may be a chip or a chip system). The map data collection apparatus includes a processor and a communications interface. The communications interface is configured to communicate with another communications apparatus. The processor is configured to run a computer program, so that the map data collection apparatus performs the method in any one of the foregoing method embodiments. In a possible design, the map data collection apparatus further includes a memory. The memory is configured to store a program instruction and data, and the processor may invoke the program code stored in the memory. Certainly, the memory may not be in the map data collection apparatus. When the map data collection apparatus is a chip system, the map data collection apparatus may include a chip, or may include a chip and another discrete device. This is not specifically limited in this embodiment of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, like a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to exemplary features and embodiments thereof, it is clear that various modifications and combinations may be made to them without departing from the scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A map data collection apparatus applied to each first vehicle among a plurality of first vehicles communicatively connected to a network side device, each first vehicle comprising at least one processor and at least one memory, wherein the at least one memory is configured to store program instructions, and the at least one processor is coupled to the at least one memory to execute the program instructions to:

receive a first instruction from the network side device, wherein the first instruction instructs a map data reporting manner to the first vehicle, the first instruction comprises confidence information, and the confidence information indicates a required confidence of map data reported by the first vehicle, and wherein the first instruction comprises a first trigger condition and a second trigger condition;

send the map data to the network side device based on the map data reporting manner instructed by the first instruction, wherein confidence of the map data is not lower than the confidence indicated by the confidence information, wherein the at least one processor is coupled to the at least one memory to execute the program instructions to perform one of:

a) obtain the first trigger condition from the first instruction, wherein the first trigger condition is a first trigger condition that the first vehicle stops reporting the map data in the manner instructed by the first instruction;

determine that the first vehicle meets the first trigger condition based on that the map data transmitted by the first vehicle reaches at least one threshold set forth by the first trigger condition; and stop reporting the map data in the manner instructed by the first instruction, or b) obtain the second trigger condition from the first instruction that the first vehicle starts to report the map data in the manner instructed by the first instruction, and wherein the at least one processor is coupled to the at least one memory to execute the program instructions to:

determine that the first vehicle meets the second trigger condition;

receive a second instruction from the network side device, wherein the second instruction instructs the first vehicle to stop reporting the map data in the manner instructed by the first instruction, and wherein the second instruction is transmitted separately from the first instruction; and stop, according to the second instruction, reporting the map data in the manner instructed by the first instruction, wherein the at least one processor is coupled to the at least one memory to execute the program instructions to:

obtain, from the network side device, a freshness value associated with a collection object;

determine, based on the freshness value, a collection level among a plurality of collection levels; and send, to the network side device, the map data based on the collection level.

2. The apparatus according to claim 1, wherein the at least one processor is coupled to the at least one memory to execute the program instructions to:

delete, by the first vehicle, from collected map data based on the confidence information in the first instruction, the map data with confidence lower than the confidence indicated by the confidence information.

3. The apparatus according to claim 1, wherein the first trigger condition comprises at least one of the following:

a predetermined time is reached;

a quantity of times of reporting the map data in the manner instructed by the first instruction exceeds a first threshold; or a quantity of samples of reporting the map data in the manner instructed by the first instruction exceeds a second threshold.

4. The apparatus according to claim 1, wherein the plurality of collection levels correspond to different collection frequencies and collection densities, and wherein each collection level of the plurality of collection levels correspond to a distinct range of the freshness value.

5. The apparatus according to claim 4, wherein the freshness value represents a change period of the collection object.

6. A map data collection apparatus applied to a network side device communicatively connected to a plurality of first vehicles, the network side device comprising at least one processor and at least one memory, wherein the at least one memory is configured to store program instructions, and the at least one processor is coupled to the at least one memory to execute the program instructions to:

send a first instruction to a first vehicle of the plurality of first vehicles, wherein the first instruction instructs a map data reporting manner to the first vehicle, the first instruction comprises confidence information, and the confidence information indicates a required confidence of map data reported by the first vehicle, and wherein the first instruction comprises a first trigger condition and a second trigger condition;

receive the map data that is sent by the first vehicle in the reporting manner instructed by the first instruction, wherein confidence of the map data is not lower than the confidence indicated by the confidence information, wherein the at least one processor is coupled to the at least one memory to execute the program instructions to perform one of:

a) instruct the first trigger condition from the first instruction that the first vehicle stops reporting the map data, in the manner instructed by the first instruction, wherein the first trigger condition sets forth at least one threshold, and wherein the first vehicle determines to stop reporting the map data based on that the map data transmitted by the first vehicle reaches the at least one threshold, or b) instructs the second trigger condition from the first instruction that the first vehicle starts to report the map data in the manner instructed by the first instruction; and send a second instruction to the first vehicle, wherein the second instruction instructs the first vehicle to stop reporting the map data in the manner instructed by the first instruction, and wherein the second instruction is transmitted separately from the first instruction, wherein the at least one processor is coupled to the at least one memory to execute the program instructions to:

send a freshness value associated with a collection object to the first vehicle, wherein the freshness value is used by the first vehicle to determine, based on the freshness value, a collection level among a plurality of collection levels, and send the map data to the network side device based on the collection level.

7. The apparatus according to claim 6, wherein the first trigger condition comprises at least one of the following:

a predetermined time is reached;

a quantity of times of reporting the map data in the manner instructed by the first instruction exceeds a first threshold; or a quantity of samples of reporting the map data in the manner instructed by the first instruction exceeds a second threshold.

8. The apparatus according to claim 6, wherein the plurality of collection levels correspond to different collection frequencies and collection densities, and wherein each collection level of the plurality of collection levels correspond to a distinct range of the freshness value.

9. The apparatus according to claim 8, wherein the freshness value represents a change period of the collection object.

10. A map data collection method, wherein the method is applied to a first vehicle among a plurality of first vehicles communicatively connected to a network side device, and the method comprises:

receiving a first instruction from the network side device, wherein the first instruction instructs a map data reporting manner to the first vehicle, the first instruction comprises confidence information, and the confidence information indicates a required confidence of map data reported by the first vehicle, and wherein the first instruction comprises first trigger information and a second trigger condition;

sending the map data to the network side device based on the map data reporting manner instructed by the first instruction, wherein confidence of the map data is not lower than the confidence indicated by the confidence information, wherein the method further comprises one of:

a) obtaining the first trigger condition from the first instruction, wherein the first trigger condition is a first trigger condition that the first vehicle meets when the first vehicle stops reporting the map data in the manner instructed by the first instruction;

determining that the first vehicle meets the first trigger condition based on that the map data transmitted by the first vehicle reaches at least one threshold set forth by the first trigger condition; and stopping reporting the map data in the manner instructed by the first instruction, or b) obtaining the second trigger condition from the first instruction that the first vehicle starts to report the map data in the manner instructed by the first instruction, and before sending the map data to the network side device, the method further comprises:

determining that the first vehicle meets the second trigger condition;

receive a second instruction from the network side device, wherein the second instruction instructs the first vehicle to stop reporting the map data in the manner instructed by the first instruction, and wherein the second instruction is transmitted separately from the first instruction; and stop, according to the second instruction, reporting the map data in the manner instructed by the first instruction, wherein the method further comprises:

obtaining, from the network side device, a freshness value associated with a collection object;

determining, based on the freshness value, a collection level among a plurality of collection levels; and sending the map data to the network side device based on the collection level.

11. The method according to claim 10, wherein the method further comprises:

deleting, by the first vehicle, from collected map data based on the confidence information in the first instruction, the map data with confidence lower than the confidence indicated by the confidence information.

12. The method according to claim 10, wherein the first trigger condition comprises at least one of the following:

a predetermined time is reached;

a quantity of times of reporting the map data in the manner instructed by the first instruction exceeds a first threshold; or a quantity of samples of reporting the map data in the manner instructed by the first instruction exceeds a second threshold.

13. The method according to claim 10, wherein the plurality of collection levels correspond to different collection frequencies and collection densities, and wherein each collection level of the plurality of collection levels correspond to a distinct range of the freshness value.

14. The apparatus according to claim 13, wherein the freshness value represents a change period of the collection object.

* * * * *